(12) United States Patent
Villanueva

(10) Patent No.: US 10,697,551 B2
(45) Date of Patent: *Jun. 30, 2020

(54) INLET PRESSURE COMPENSATION FOR A VALVE SYSTEM

(71) Applicant: Dukes Aerospace, Inc., Northridge, CA (US)

(72) Inventor: Carlos Villanueva, Northridge, CA (US)

(73) Assignee: Dukes Aerospace, Inc., Northridge, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,163

(22) Filed: Feb. 22, 2019

(65) Prior Publication Data

US 2019/0186638 A1 Jun. 20, 2019

Related U.S. Application Data

(63) Continuation of application No. 15/467,429, filed on Mar. 23, 2017, now Pat. No. 10,378,654.

(Continued)

(51) Int. Cl.
*F16K 1/12* (2006.01)
*F02C 6/08* (2006.01)
*F16K 31/40* (2006.01)
*G05D 16/10* (2006.01)
*G05D 16/00* (2006.01)
*G05D 16/20* (2006.01)

(Continued)

(52) U.S. Cl.
CPC ............... *F16K 1/126* (2013.01); *F02C 6/08* (2013.01); *F16K 1/42* (2013.01); *F16K 31/406* (2013.01); *G05D 16/024* (2019.01); *G05D 16/103* (2013.01); *G05D 16/106* (2013.01); *G05D 16/166* (2013.01); *G05D 16/2093* (2013.01); *G05D 16/2097* (2019.01); *F05D 2260/85* (2013.01); *Y10T 137/3421* (2015.04)

(58) Field of Classification Search
CPC ............ Y10T 137/3367–353; Y10T 137/3421
See application file for complete search history.

(56) References Cited

U.S. PATENT DOCUMENTS 2,592,474 A ‡ 4/1952 Schnyder ............... F16K 1/126
137/21
3,362,424 A ‡ 1/1968 Smith .................... B64D 13/02
137/22

(Continued)

*Primary Examiner* — Robert K Arundale
(74) *Attorney, Agent, or Firm* — BakerHostetler

(57) ABSTRACT

An inlet pressure valve regulation system to provide a regulated fluid flow includes a housing, first piston assembly, regulating valve, and inlet pressure conduit. The housing has an inlet at an inlet end which receives a pressurized fluid and an outlet at an outlet end which provides the regulated fluid flow. The piston assembly is arranged in the housing and has a first cavity and a control orifice to fluidly connect the inlet to the first cavity. The first piston assembly is configured to regulate the fluid flow. The regulating valve has a first valve chamber, a second valve chamber fluidly connected to a vent, a floating valve seat disposed between the first valve chamber and the second valve chamber, and a valve component. The floating valve seat includes a diaphragm and a seat having a passageway to fluidly connect the first valve chamber and the second valve chamber.

20 Claims, 9 Drawing Sheets

Related U.S. Application Data

(60) Provisional application No. 62/312,185, filed on Mar. 23, 2016.

(51) Int. Cl.
  *G05D 16/16* (2006.01)
  *F16K 1/42* (2006.01)

(56) References Cited

U.S. PATENT DOCUMENTS

| | | | | |
|---|---|---|---|---|
| 3,489,165 | A | ‡ | 1/1970 | Salerno .................. F16K 1/126 137/22 |
| 3,515,165 | A | ‡ | 6/1970 | Zadoo .................. G05D 16/106 137/220 |
| 3,703,139 | A | ‡ | 11/1972 | Furlong ................. B64D 13/02 137/87 |
| 3,734,121 | A | | 5/1973 | Rowe et al. |
| 3,792,713 | A | ‡ | 2/1974 | Zadoo ..................... F16K 1/126 137/220 |
| 3,865,128 | A | ‡ | 2/1975 | Zadoo .................. G05D 16/106 137/220 |
| 5,775,101 | A | ‡ | 7/1998 | Dunlevy ................. B64F 1/28 137/219 |
| 6,796,323 | B1 | | 9/2004 | Taylor |
| 2010/0147400 | A1 | ‡ | 6/2010 | Hawkins ............... F16K 17/105 137/48 |
| 2015/0276072 | A1 | ‡ | 10/2015 | Rebreanu .................. F16K 1/00 137/512.5 |
| 2016/0237913 | A1 | ‡ | 8/2016 | Marocchini ........... F01D 17/105 |

‡ imported from a related application

INLET PRESSURE COMPENSATION FOR A VALVE SYSTEM

CROSS REFERENCE TO PRIOR APPLICATIONS

This application is a continuation of the U.S. patent application Ser. No. 15/467,429, filed Mar. 23, 2017, which is incorporated herein by reference in its entirety; which application claims the benefit of U.S. Provisional Application No. 62/312,185 filed on Mar. 23, 2016, which is hereby incorporated by reference in its entirety for all purposes as if fully set forth herein.

BACKGROUND OF THE DISCLOSURE

Field of the Disclosure

The disclosure generally relates to an apparatus and method for controlling a valve system used to regulate fluid flow. Specifically, the disclosure relates to an inlet pressure compensated valve system control to improve pressure regulation of a valve.

Related Art

Pressure regulating valves have applications in a wide variety of areas that use pressurized fluids, for example, to drive pneumatic systems. These systems typically require one or more pressure regulating valves partially controlled through electronic systems to permit operation remotely. One application for these pressure regulating valves are in aircraft systems that utilize a turbine engine.

Because these pressure regulating valves are used in critical functions, it is important that the valves operate consistently within a desired regulation band. However, in some instances the regulating valves do not fully compensate for the various fluid pressures exerted on the regulating valve. Moreover, compensating regulators have been used in the past by using a belleville washer or similar solutions. However, these constructions tend to cause misalignment and leakage. Leakage in this area will cause the valve to fail.

Accordingly, there is a need for a pressure regulating valve system that is configured to more completely compensate for external pressures and that is more robust.

SUMMARY OF THE DISCLOSURE

In one aspect, an inlet pressure valve regulation system to provide a regulated fluid flow includes a housing having an inlet at an inlet end which receives a pressurized fluid and an outlet at an outlet end which provides the regulated fluid flow, a piston assembly arranged in the housing having a first cavity, a control orifice to fluidly connect the inlet to the first cavity, the first piston assembly configured to regulate a fluid flow, a regulating valve having a first valve chamber, a second valve chamber fluidly connected to a vent, a floating valve seat disposed between the first valve chamber and the second valve chamber, and a valve component, a passageway being in cooperative alignment with the valve component, and an inlet pressure conduit to fluidly connect the first cavity to the first valve chamber, where an increase in pressure at the inlet is conveyed via the control orifice, the first valve chamber, an inlet pressure, and the first valve chamber to urge the floating valve seat to generate a seal with the valve component which increases pressure within the first piston assembly to regulate the fluid flow.

In another aspect, an inlet pressure valve regulation system to provide a regulated fluid flow includes a housing having an inlet at an inlet end which receives a pressurized fluid and an outlet at an outlet end which provides the regulated fluid flow, a piston assembly arranged in the housing having a first cavity, a control orifice to fluidly connect the inlet to the first cavity, the first piston assembly configured to regulate a fluid flow, a regulating valve having a first valve chamber, a second valve chamber fluidly connected to a vent, a floating valve seat disposed between the first valve chamber and the second valve chamber, and a valve component, a passageway being in cooperative alignment with the valve component, and an inlet pressure conduit to fluidly connect the first cavity to the first valve chamber, wherein an increase in pressure at the inlet is conveyed via the control orifice, the first valve chamber, an inlet pressure, and the first valve chamber generates a seal with the valve component to regulate the fluid flow.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

DETAILED DESCRIPTION

Pressure regulating valves have applications in a wide variety of areas that use pressurized fluids to drive pneumatic systems, lubrication systems, fuel systems, cooling systems, hydraulic systems, and the like. These systems typically require one or more pressure regulating valves controlled partially through electronic systems to permit operation remotely.

One application for these pressure regulating valves are in aircraft systems that utilize turbine engines. For example, due to the cold conditions during flight, aircraft often use bleed air from the turbine engines in order to perform de-icing of the exterior portions of the aircraft such as engine cowls, wings, and the like. This bleed air can also be used to maintain cabin pressurization, de-ice windows, maintain temperature of the cabin and luggage compartments, assist in the function of ejector seats, provide air for blown flaps, provide air for windshield blow mechanisms, and the like. For example, the de-icing of the engine cowls typically requires pressure regulating valves to regulate the bleed air to compensate for variations in throttle settings, icing conditions and the like in order to allow the system to be controlled automatically or from the aircraft cockpit. These valves need to be reliable in performance, low in weight, and compact in size. It is also preferable that these valves are self-powered by using the pressure generated within the system itself for supplying the energy to actuate the valve.

Reference in this specification to "one aspect," "an aspect," "other aspects," "one or more aspects," or the like means that a particular feature, structure, or characteristic described in connection with the aspect is included in at least one aspect of the disclosure. The appearance of, for example, "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
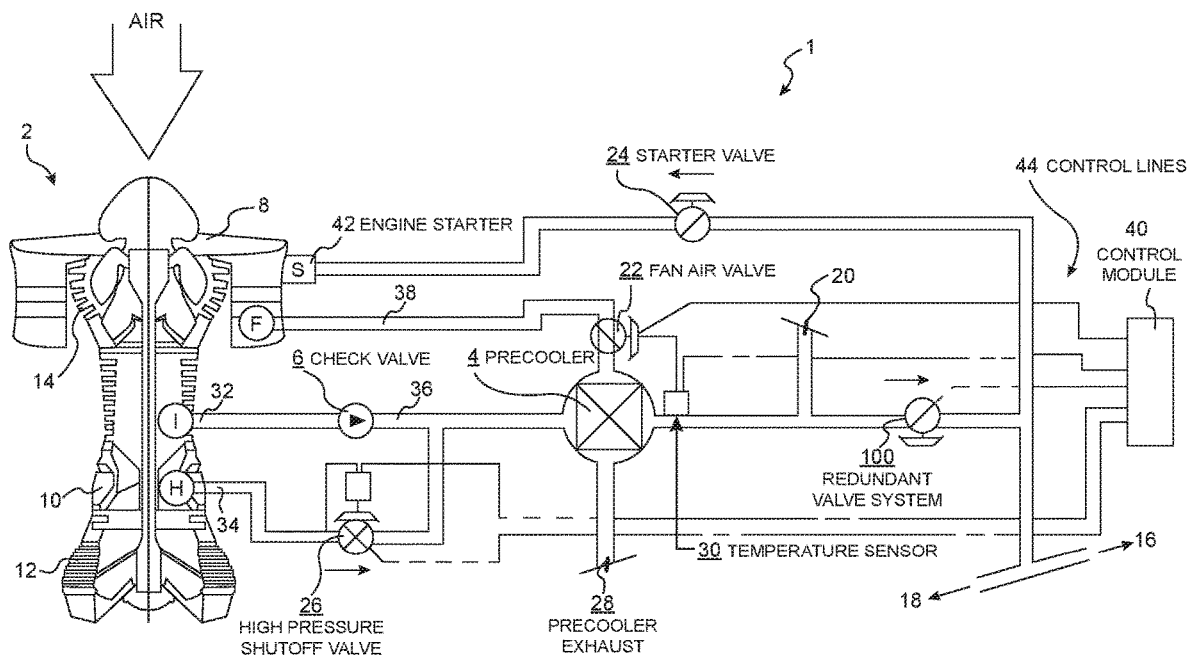
FIG. 1 illustrates a turbine engine schematic with bleed air that is siphoned from the turbine engine in accordance with an aspect of the disclosure.

FIG. 1 illustrates a system 1 that may include a turbine engine 2 and fluid connections where bleed air from the turbine engine 2 is siphoned off and utilized for other purposes. The turbine engine 2 may be a turbojet engine, a turboprop engine, a turboshaft engine, a propfan engine, or another airbreathing jet engine known in the art. The turbine engine 2 may include a burner 10 and a turbine 12. As air enters the turbine engine 2 at the fan 8, the air travels through a compressor 14 where the air becomes heated and pressurized to, for example, temperatures around 1250° F. and pressures around 350 psi. A portion of the air that passes through the compressor 14 may be siphoned off at an outlet 32 and/or an outlet 34.

The turbine engine 2 may be in fluid connection with a first check valve 6 along a conduit 36. Subsequently, there may be a precooler 4 to cool a portion of the bleed air with air from the compressor 14 and/or air from the fan 8 provided by a conduit 38. Subsequently, the bleed air enters a valve system 100, which regulates the flow of bleed air based on pressure and directs it for other purposes such as de-icing the engine cowl, the wings, or the like at outlet 16 and/or outlet 18. The bleed air may also be provided through outlet 20. This bleed air can also be used to maintain cabin pressurization, de-ice windows, maintain temperature of the cabin and luggage compartments, assist in the function of ejector seats, blow rainwater off the windshield, blow the flaps, and the like.

Although the valve system 100 is illustrated in FIG. 1 as being downstream of a precooler 4. In some applications, the precooler 4 may not be necessary and the valve system 100 may be directly connected to the turbine engine 2 to siphon air pressurized by the compressor 14.

The system 1 may further include an engine starter 42 and starter valve 24, a high-pressure shutoff valve 26, a precooler exhaust 28, and a fan air valve 22. The system 1 may further include a controller implemented as a control module 40.

The control module 40 may sense the temperature from a temperature sensor 30, may sense pressure in numerous areas of the valve system 100, may sense temperature in numerous areas of the valve system 100, may sense positions of components of the valve system 100, may control the fan air valve 22, and may control the high-pressure shutoff valve 26. The control module 40 may further control the valve system 100. The control module 40 may be implemented with dedicated hardware as defined herein and control system components and/or receive sensor inputs with control lines 44. The control module 40 may sense when a valve of the valve system 100 has failed and further control a second valve of the valve system 100. However, it should be noted that the valve system 100 may have applications in a wide variety of areas that use pressurized fluids to drive pneumatic systems, lubrication systems, fuel systems, cooling systems, hydraulic systems, and the like.

To solve this regulation band issue, a new pilot seat/poppet concept was developed. Originally a pilot poppet moved towards its seat to restrict the flow and increase the control pressure. The disclosure contemplates a seat that can move towards the poppet proportional to the inlet pressure and in doing so keeping a regulation band flat. The valve functions by using downstream pressure as feedback on bellows that may then act on a pilot stage poppet to control the filling and dumping of air pressure supplied by the inlet pressure through an orifice (control pressure) behind a piston. As inlet pressure increases so does the downstream pressure. The downstream pressure is sensed by the bellows which extends and closes the control poppet. The poppet restricts the flow from the seat and increases the control pressure behind the piston. The piston closes until a new regulation is reached for a given inlet pressure. The construction of the valve and associated process is described in greater detail below.

Figure 2:
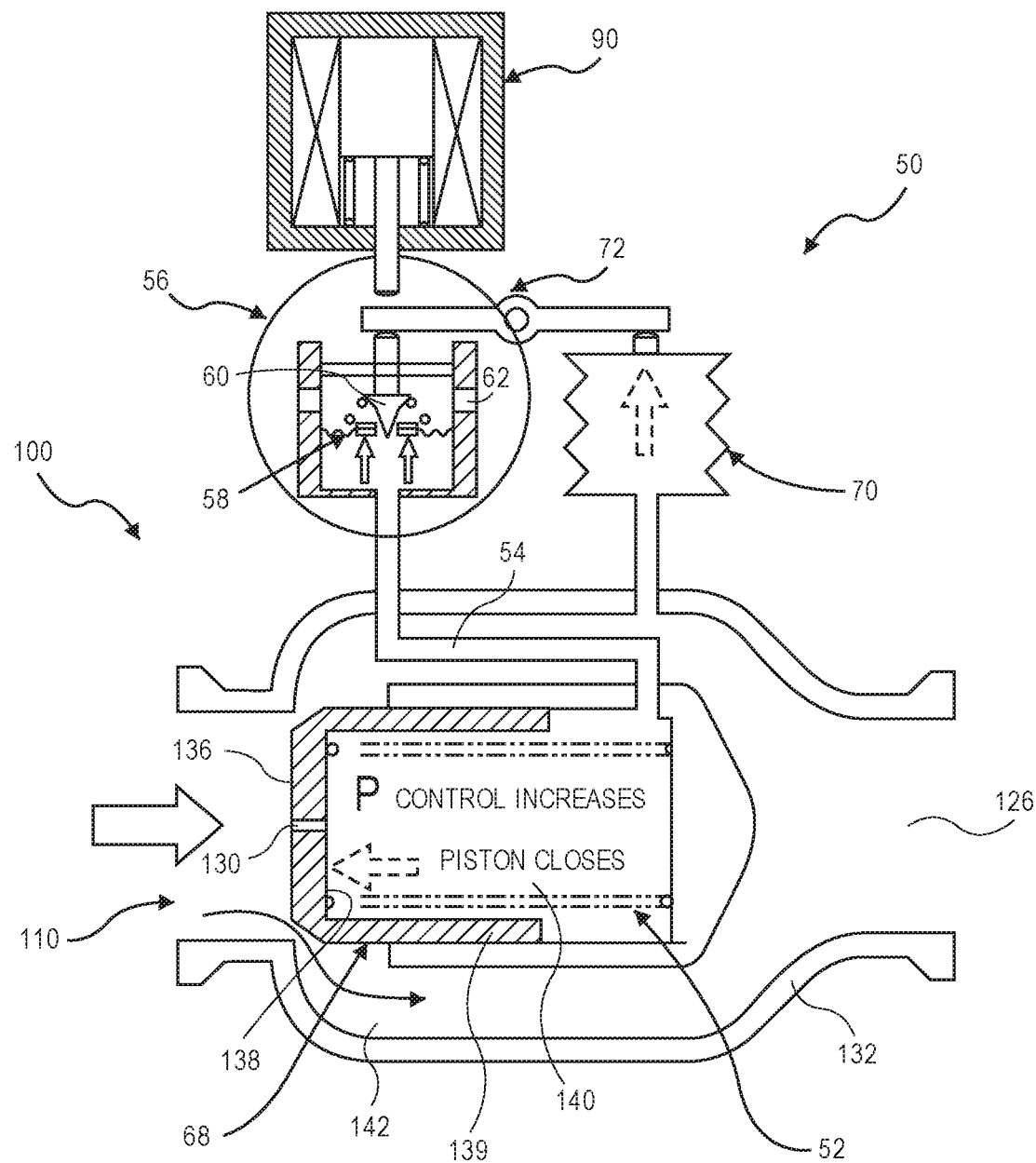
FIG. 2 illustrates a valve system with an inlet pressure valve regulation open in accordance with an aspect of the disclosure.

FIG. 2 illustrates the valve system 100 with an inlet pressure valve regulation system 50 open in accordance with an aspect of the disclosure. As shown in FIG. 2, the valve system 100 may include a housing 132 having an inlet 110 and an outlet 126. The outlet 126 may subsequently connect to the outlet 16 and/or the outlet 18 shown in FIG. 1. Towards the inlet 110 end of the housing 132, there is a first piston assembly 139.

In one aspect, the valve system 100 may also include a second piston assembly (not shown) towards the outlet 126 end of the valve system 100. Although the inlet pressure valve regulation system 50 is shown to regulate the first piston assembly 139, in various examples, one or both of the first piston assembly 139 and the second piston assembly (not shown) may include the inlet pressure valve regulation system 50. Details of the second piston assembly are disclosed in U.S. patent application Ser. No. 15/042,644 filed on Feb. 12, 2016 incorporated herein by reference in its entirety.

The first piston assembly 139 may move longitudinally along a center line of the housing 132 to regulate airflow through the inlet 110 in response to inlet pressure such as the upstream pressure and/or downstream pressure. To regulate the first piston assembly 139 in response to inlet pressure, the inlet pressure valve regulation system 50 may include a piston actuator 52, an inlet pressure conduit 54, and a regulating valve 56. In one aspect, the regulating valve 56 may be a spring loaded closed, solenoid controlled, pilot poppet operated, pneumatically actuated, piston modulating, regulating, and shutoff valve.

The piston actuator 52 may include any suitable actuator such as a pneumatic actuator, spring, or the like. The regulating valve 56 may include any suitable valve such as, a poppet valve, a needle valve, a valve component, and the like. In a particular example, the regulating valve 56 is a poppet style valve. The regulating valve 56 may include a floating seat assembly 58, a valve member 60 and one or more vents 62. The first piston assembly 139 may have a first cavity 140, which is in fluid connection with the regulating valve 56 via the inlet pressure conduit 54. The first piston assembly 139 may also include a control orifice 130, which provides pneumatic connection between the inlet 110 and the first cavity 140 of the first piston assembly 139.

Figure 3:
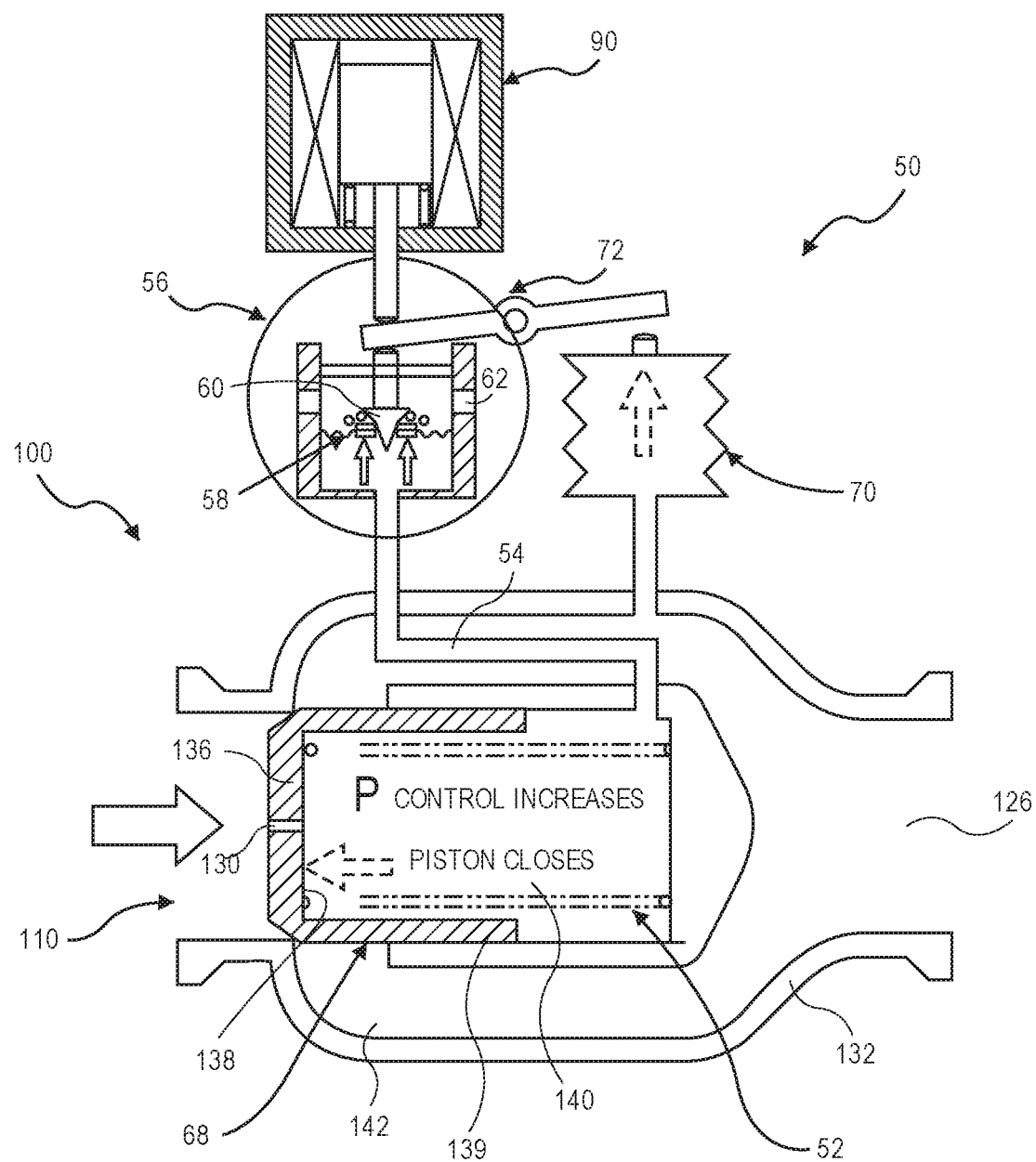
FIG. 3 illustrates the valve system with the inlet pressure valve regulation closed in accordance with an aspect of the disclosure.

FIG. 3 illustrates the valve system with the inlet pressure valve regulation closed in accordance with an aspect of the disclosure. The regulating valve 56 may be actuated by a solenoid 90. The solenoid 90 may contact a lever 72 and urge the displacement of the valve member 60 toward the floating seat assembly 58 (shown in FIGS. 5 and 6). The floating seat assembly 58 may include a seat 64 and a diaphragm 66. The seat 64 and the valve member 60 are in cooperative alignment. In response to the seat 64 forming a seal with the valve member 60, access to the vents 62 is closed or reduced and pressure within the first cavity 140 is increased.

This increased pressure in the first cavity 140 in combination with an urging of the piston actuator 52 urges a first face 136 of a piston 68 toward the inlet 110 which closes or reduces flow through the inlet 110 as shown in FIG. 3. Conversely, as shown in FIG. 2, a reduction in inlet pressure acts to draw the seat 64 away from the valve member 60 which allows more air to flow through the vents 62 and this allows the first face 136 to move away from the inlet 110 creating a passageway 142. The bleed air will be able to flow from through inlet 110 through the passageway 142 towards the outlet 126 and/or second piston assembly (not shown) if utilized.

Figure 4:
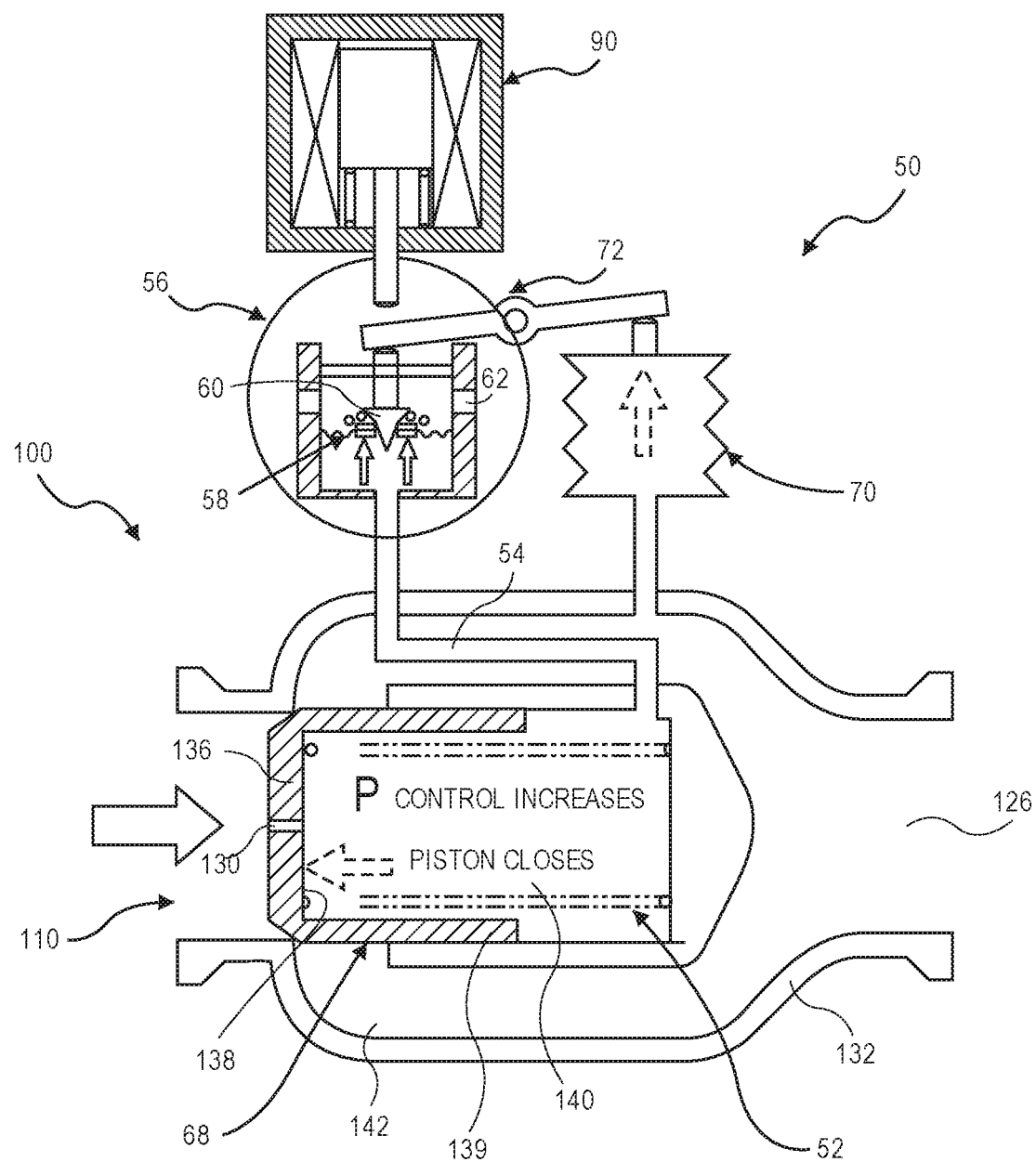
FIG. 4 illustrates the valve system with the inlet pressure valve regulation closed in accordance with an aspect of the disclosure.

FIG. 4 illustrates the valve system with the inlet pressure valve regulation closed in accordance with an aspect of the disclosure. In response to an increased inlet pressure at the inlet 110, an increased amount of air enters the control orifice 130, is conveyed through the inlet pressure conduit 54, and urges the displacement of the floating seat assembly 58 toward the valve member 60. The seat 64 and the valve member 60 are in cooperative alignment. In response to the seat 64 forming a seal with the valve member 60, access to the vents 62 is closed or reduced and pressure within the first cavity 140 is increased.

This increased pressure in the first cavity 140 in combination with an urging of the piston actuator 52 urges a first face 136 of a piston 68 toward the inlet 110 which closes or reduces flow through the inlet 110 as shown in FIG. 4. Conversely, as shown in FIG. 2, a reduction in inlet pressure acts to draw the seat 64 away from the valve member 60 which allows more air to flow through the vents 62 and this allows the first face 136 to move away from the inlet 110 creating a passageway 142. The bleed air will be able to flow from through inlet 110 through the passageway 142 towards the outlet 126 and/or second piston assembly (not shown) if utilized.

To regulate the first piston assembly 139 in response to downstream pressure, the first piston assembly 139 may include a regulator bellows 70 configured to urge the valve member 60 toward and away from the seat 64. In a particular example, the regulator bellows 70 may include a linkage and actuate the lever 72 although in other examples, the regulator bellows 70 may be configured to urge the valve member 60 directly. In response to an increase in downstream pressure, the regulator bellows 70 may be configured to urge the valve member 60 toward the seat 64. As already described, stopping or reducing flow through the seat 64 increases pressure within the first cavity 140 which acts to urge the first face 136 of the piston 68 toward the inlet 110 which closes or reduces flow through the inlet 110 as shown in FIG. 4. Conversely, as shown in FIG. 2, a reduction in downstream pressure acts to constrict the regulator bellows 70 and urges the valve member 60 away from the seat 64. This opening of the regulating valve 56 allows more air to flow through the vents 62 and this allows the first face 136 to move away from the inlet 110 which allows a greater flow through the inlet 110.

Figure 5:
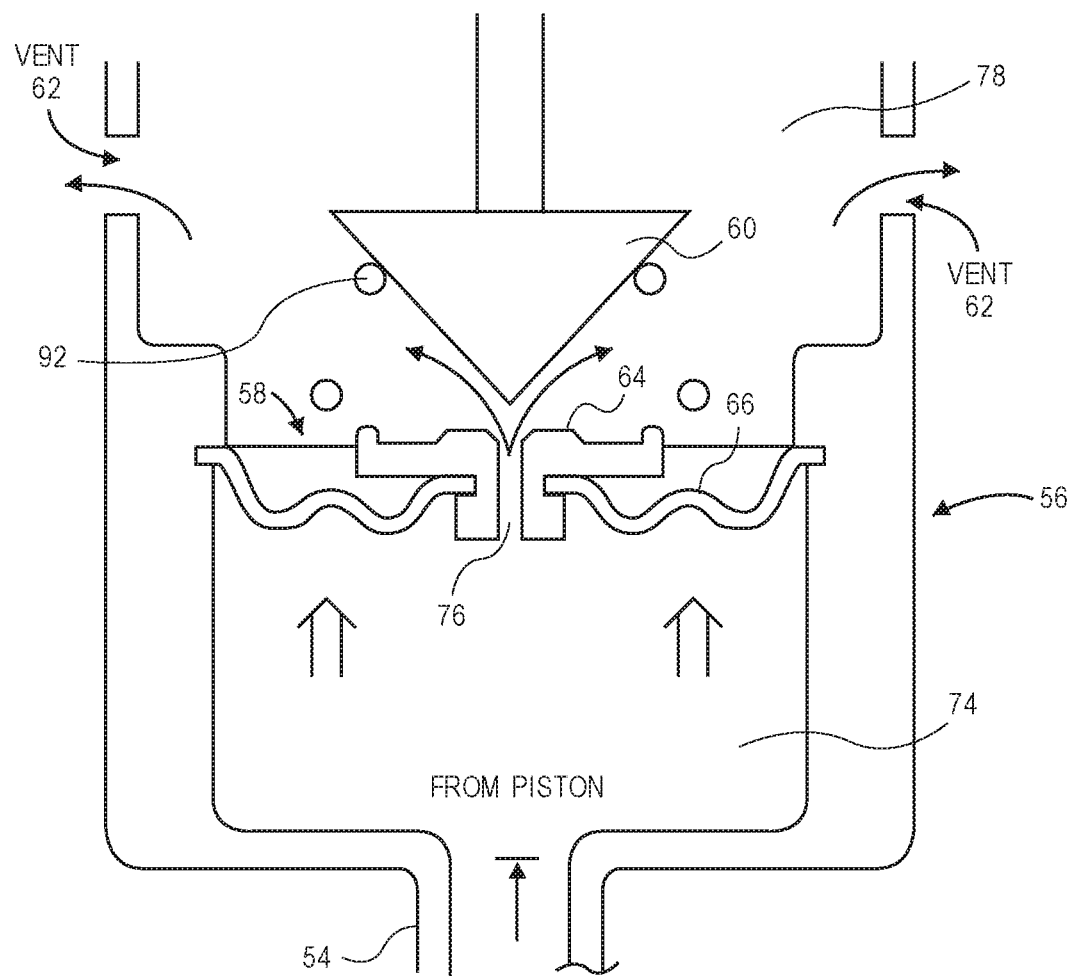
FIG. 5 illustrates a regulating valve with the inlet pressure valve regulation open in accordance with an aspect of the disclosure.
Figure 6:
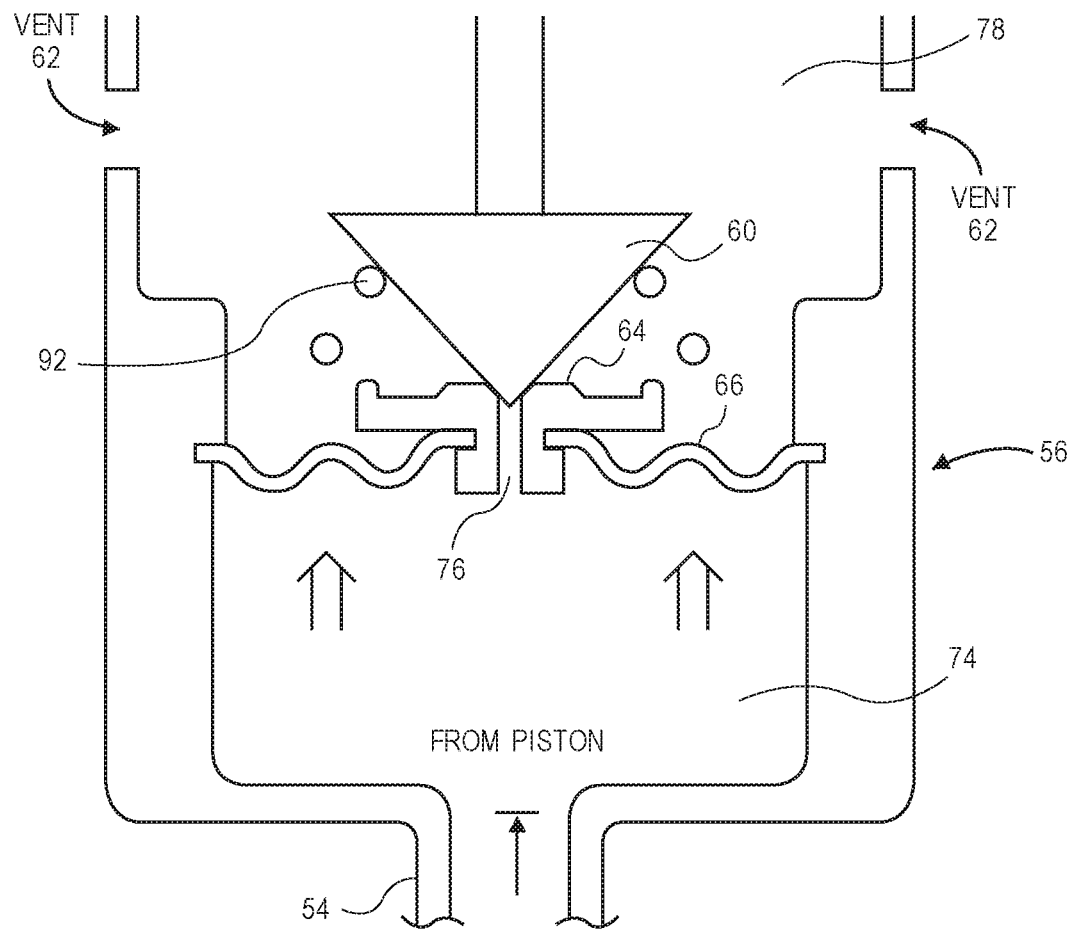
FIG. 6 illustrates the regulating valve with the inlet pressure valve regulation closed in accordance with an aspect of the disclosure.

FIGS. 5 and 6 illustrate the regulating valve 56 suitable for use with the inlet pressure valve regulation system 50 in an open and closed configuration, respectively. Although the regulating valve 56 is described with reference to the valve system 100 shown in FIG. 2, the regulating valve 56 may be utilized in any suitable device or system. Examples of suitable devices and systems include heating and air conditioning system, hydraulic systems, pneumatic systems, lubrication systems, fuel systems, cooling systems, and the like and the like. The valve member 60 may be urged towards or away from the diaphragm 66 with a spring 92. The diaphragm 66 may be formed of any type of material. In one aspect, the diaphragm 66 may be formed of a metallic material. In one aspect, the diaphragm 66 may be made out of Inconel X750. In one aspect, the diaphragm 66 may comprise Inconel 718. In one aspect, the diaphragm 66 may comprise steel. In one aspect, the diaphragm 66 may comprise 440C steel. In one aspect the seat 64 may be formed of a metallic material. In one aspect the seat 64 may be formed of Inconel 625. In one aspect the seat 64 may be formed of Inconel 718. In one aspect the seat 64 may be formed of steel. In one aspect the seat 64 may be formed of 440C steel. In one aspect the seat 64 may be press fit into the diaphragm 66. In one aspect the seat 64 may be welded to the diaphragm 66. In one aspect the seat 64 may be mechanically fastened to the diaphragm 66. In one aspect the seat 64 may be mechanically fastened to the diaphragm 66 with a threaded fastener surface. In one aspect the seat 64 may be mechanically fastened to the diaphragm 66 together with adhesive such as Loctite. In one aspect the seat 64 may be mechanically fastened to the diaphragm 66 and subjected to a peening process.

As shown in FIG. 6, in the open conformation, a flow of air or other suitable fluid entering a first valve chamber 74 via the inlet pressure conduit 54 may pass through a passageway 76 in the seat 64, into a second valve chamber 78, and out the vents 62. In response to the pressure within the first valve chamber 74 exceeding the pressure within the second valve chamber 78, the floating seat assembly 58 is urged toward the valve member 60. As the seat 64 approaches the valve member 60, flow through the passageway 76 is further restricted which increases the delta pressure between the first valve chamber 74 and the second valve chamber 78 which urges the floating seat assembly 58 still further. In response to the valve member 60 sealing the passageway 76 as shown in FIG. 6, flow from the first valve chamber 74 to the second valve chamber 78 is stopped or reduced.

Figure 7:
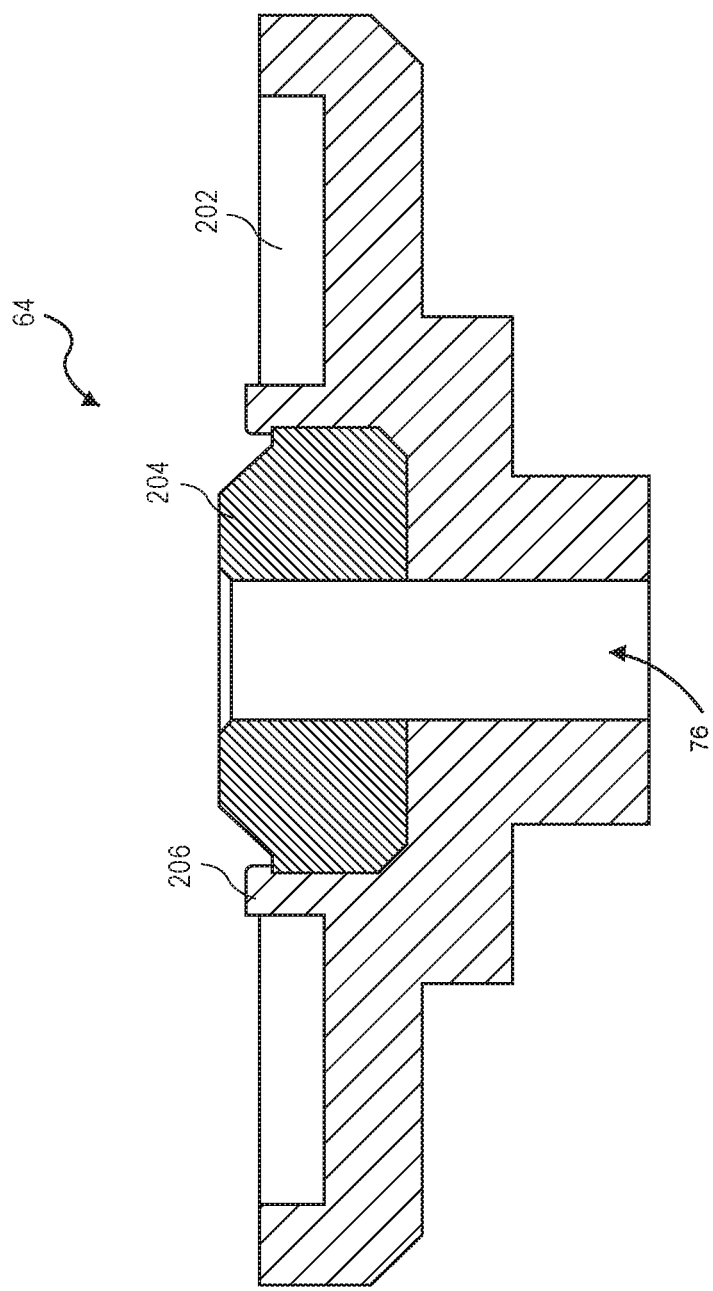
FIG. 7 illustrates a seat of a floating seat assembly of the regulating valve in accordance with an aspect of the disclosure.

FIG. 7 illustrates a seat of a floating seat assembly of the regulating valve in accordance with an aspect of the disclosure. In this regard, in one aspect the seat 64 may be configured as a multi-component structure. As illustrated in FIG. 7, the seat 64 may include an insert seat 202 and a plug 204.

In one aspect, the insert seat 202 may comprise Inconel 625. In other aspects, the insert seat 202 may comprise a metallic material, Inconel X750, Inconel 718, steel, 440C steel, or the like. In one aspect the insert seat 202 may be press fit into the diaphragm 66. In one aspect the insert seat 202 may be welded to the diaphragm 66. In one aspect the insert seat 202 may be mechanically fastened to the diaphragm 66. In one aspect the insert seat 202 may be mechanically fastened to the diaphragm 66 with a threaded fastener surface. In one aspect the insert seat 202 may be mechanically fastened to the diaphragm 66 together with adhesive such as Loctite. In one aspect the insert seat 202 may be mechanically fastened to the diaphragm 66 and subjected to a peening process.

In one aspect, the plug 204 may comprise 440C steel. In other aspects, the plug 204 may comprise a metallic material, Inconel X750, Inconel 718, steel, Inconel 625, or the like.

In one aspect the plug 204 may be placed into the insert seat 202 utilizing a press/swage process. In one aspect the plug 204 may be press fit into the insert seat 202. In one aspect a wall 206 of the insert seat 202 may be staked over the plug 204.

In one aspect the plug 204 may be welded to the insert seat 202. In one aspect the plug 204 may be mechanically fastened to the insert seat 202. In one aspect the plug 204 may be mechanically fastened to the insert seat 202 with a threaded fastener surface. In one aspect the plug 204 may be mechanically fastened to the insert seat 202 together with adhesive such as Loctite. In one aspect the plug 204 may be mechanically fastened to the insert seat 202 and subjected to a peening process.

In one aspect, once the seat 64 is assembled with the insert seat 202 and the plug 204, the passageway 76 may be formed by drilling therethrough.

Figure 8:
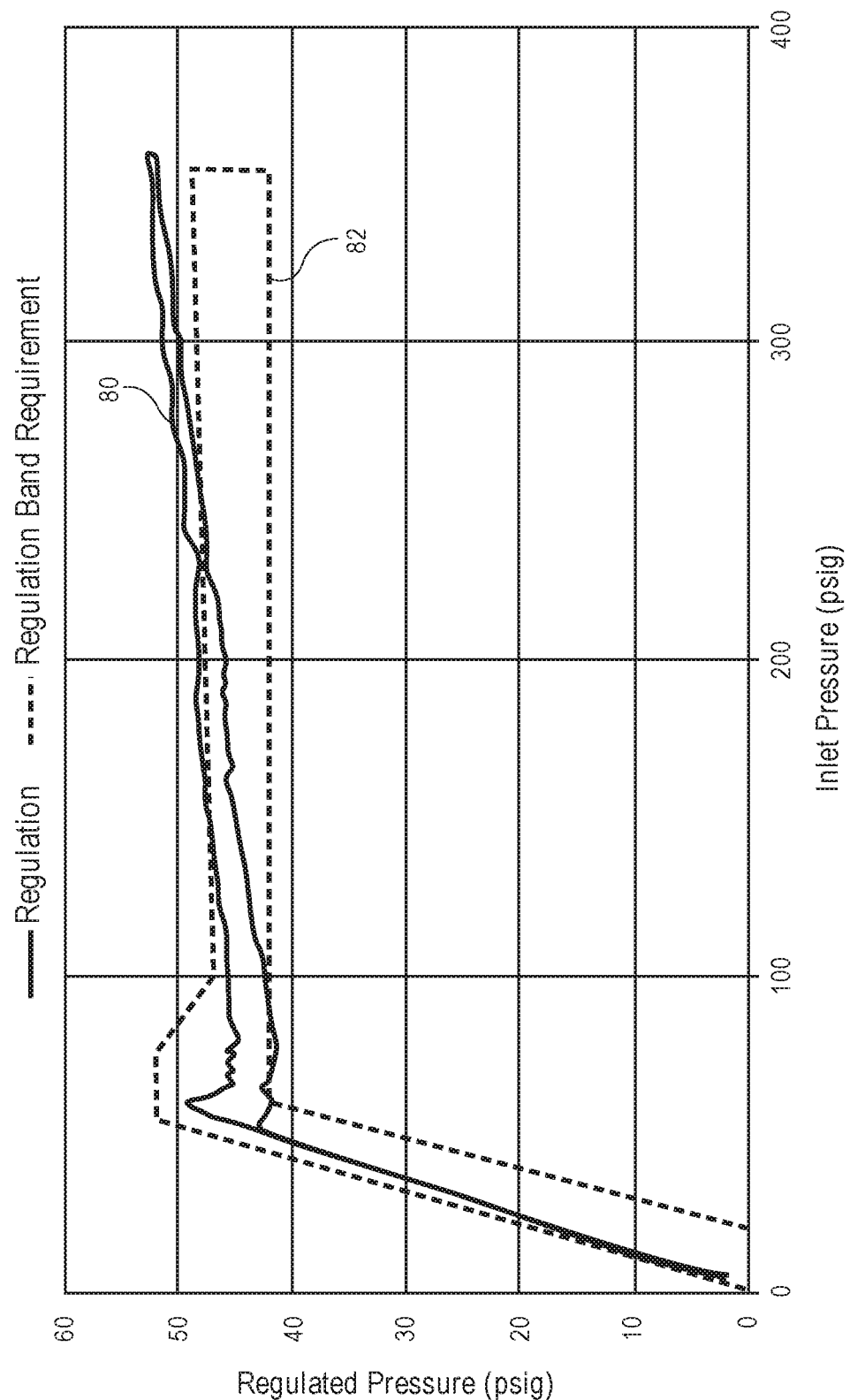
FIG. 8 illustrates a regulated pressure profile of a prior art valve system in response to inlet pressure in comparison to a regulation band requirement.

FIG. 7 illustrates a regulated pressure profile of a prior art valve system in response to inlet pressure in comparison to a regulation band requirement. As shown in FIG. 8, an observed pressure profile 80 of the prior art valve system deviates from a pressure band requirement 82 for the prior art valve system. Such deviations may cause increased wear, increase costs, and undesirable operation associated with the system 1 shown in FIG. 1. The deviation may be due to hysteresis in the regulating valve 56 and/or other components.

Figure 9:
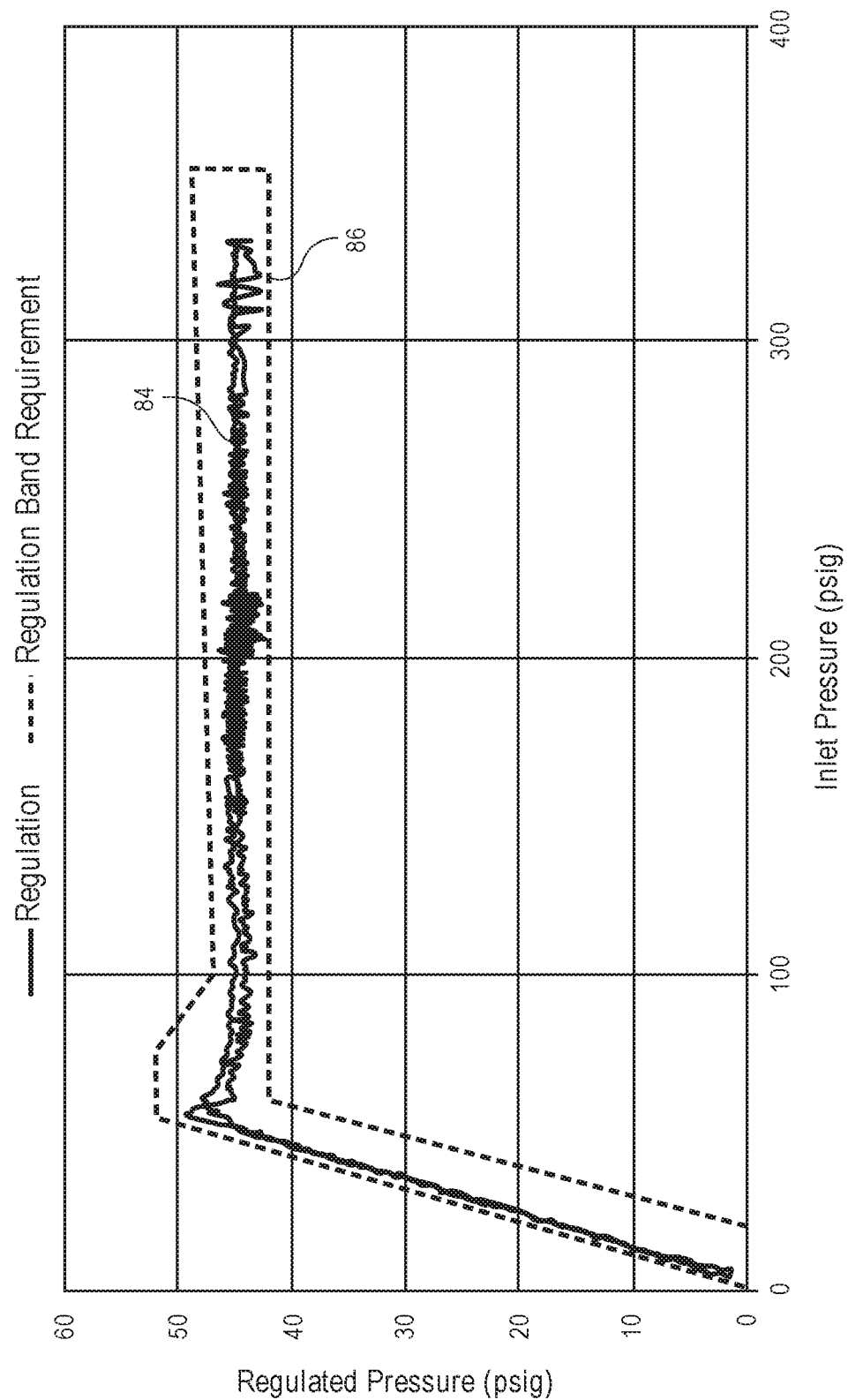
FIG. 9 illustrates a regulated pressure profile of the valve system with the inlet pressure valve regulation in accordance with an aspect of the disclosure and in response to inlet pressure in comparison to a regulation band requirement.

FIG. 9 illustrates a regulated pressure profile of the valve system 100 with the inlet pressure valve regulation system 50 in accordance with an aspect of the disclosure and in response to inlet pressure in comparison to a regulation band requirement. As shown in FIG. 9, an observed pressure profile 84 of the valve system 100 with the inlet pressure valve regulation system 50 is regulated to stay within a pressure band requirement 86 for the valve system 100 with the inlet pressure valve regulation system 50. This improved regulation in comparison to prior art systems may reduce costs associated with maintaining the system 1 shown in FIG. 1 and provide desired operation.

Accordingly, the disclosure has set forth a pressure regulating valve system that operates more consistently within a desired regulation band. Moreover, the pressure regulating valve system is configured to more completely compensate for external pressures and is more robust. The disclosed valves are reliable in performance, low in weight, and compact in size. These valves may be self-powered by using the pressure generated within the system itself for supplying the energy to actuate the valve.

Further in accordance with various aspects of the disclosure, the methods described herein are intended for operation with dedicated hardware implementations including, but not limited to, processors, microprocessors, computers, PCs, semiconductors, application specific integrated circuits (ASIC), programmable logic arrays, cloud computing devices, and other hardware devices constructed to implement the methods described herein.

The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An inlet pressure valve regulation system to provide a regulated fluid flow, comprising:
    a housing having an inlet at an inlet end configured to receive a pressurized fluid and an outlet at an outlet end configured to provide the regulated fluid flow;
    a piston assembly arranged in the housing having a first cavity, a control orifice configured to fluidly connect the inlet to the first cavity, the piston assembly configured to regulate a fluid flow;
    a regulating valve having a first valve chamber, a second valve chamber fluidly connected to a vent, a floating valve seat disposed between the first valve chamber and the second valve chamber, and a valve component; and
    an inlet pressure conduit configured to fluidly connect the first cavity to the first valve chamber,
    wherein an increase in pressure at the inlet is conveyed via the control orifice, the first valve chamber, the inlet pressure conduit, and the second valve chamber to position the floating valve seat to generate a seal with the valve component to vary pressure within the piston assembly to regulate the fluid flow.

2. The inlet pressure valve regulation system according to claim 1, further comprising:
    a downstream regulation system having a regulator in fluid communication with the fluid flow downstream of the piston assembly, the regulator being configured to urge the valve component toward the floating valve seat in response to the fluid flow downstream of the piston assembly.

3. The inlet pressure valve regulation system according to claim 1, further comprising:
   a downstream regulation system having a regulator bellows in fluid communication with the fluid flow downstream of the piston assembly, the regulator bellows being configured to urge the valve component toward the floating valve seat in response to the fluid flow downstream of the piston assembly.

4. The inlet pressure valve regulation system according to claim 1, further comprising:
   a lever configured to urge the valve component toward the floating valve seat; and
   a downstream regulation system having a regulator bellows in fluid communication with the fluid flow downstream of the piston assembly, the regulator bellows being configured to contact the lever and urge the valve component toward the floating valve seat in response to the fluid flow downstream of the piston assembly.

5. The inlet pressure valve regulation system according to claim 1, further comprising:
   a solenoid system being configured to urge the valve component toward the floating valve seat in response to a control system.

6. The inlet pressure valve regulation system according to claim 1, further comprising:
   a downstream regulation system having a regulator bellows in fluid communication with the fluid flow downstream of the piston assembly, the regulator bellows being configured to urge the valve component toward the floating valve seat in response to the fluid flow downstream of the piston assembly; and
   a solenoid system being configured to urge the valve component toward the floating valve seat in response to a control system.

7. The inlet pressure valve regulation system according to claim 1, wherein the piston assembly is configured to regulate the fluid flow by moving to close the inlet and further configured to regulate the fluid flow by moving to open the inlet.

8. The inlet pressure valve regulation system according to claim 1, wherein the floating valve seat includes a diaphragm and the floating valve seat having a passageway to fluidly connect the first valve chamber and the second valve chamber.

9. The inlet pressure valve regulation system according to claim 1, further comprising:
   a piston actuator to urge the piston assembly to close.

10. The inlet pressure valve regulation system according to claim 1, further comprising:
    a downstream regulation system having a regulator bellows in fluid communication with the fluid flow downstream of the piston assembly, the regulator bellows being configured to expand and urge the valve component toward the floating valve seat in response to the fluid flow downstream of the piston assembly.

11. An inlet pressure valve regulation system to provide a regulated fluid flow, comprising:
    a housing having an inlet at an inlet end configured to receive a pressurized fluid and an outlet at an outlet end configured to provide the regulated fluid flow;
    a piston assembly arranged in the housing having a first cavity, a control orifice to fluidly connect the inlet to the first cavity, the piston assembly configured to regulate a fluid flow;
    a regulating valve having a first valve chamber, a second valve chamber fluidly connected to a vent, a floating valve seat disposed between the first valve chamber and the second valve chamber, and a valve component; and
    an inlet pressure conduit configured to fluidly connect the first cavity to the first valve chamber, wherein an increase in pressure at the inlet is conveyed via the control orifice, the first valve chamber, the inlet pressure conduit, and the second valve chamber to position the floating valve seat of the valve component to regulate the fluid flow.

12. The inlet pressure valve regulation system according to claim 11, further comprising:
    a downstream regulation system having a regulator in fluid communication with the fluid flow downstream of the piston assembly, the regulator being configured to urge the valve component toward the floating valve seat in response to the fluid flow downstream of the piston assembly.

13. The inlet pressure valve regulation system according to claim 11, further comprising:
    a downstream regulation system having a regulator bellows in fluid communication with the fluid flow downstream of the piston assembly, the regulator bellows being configured to urge the valve component toward the floating valve seat in response to the fluid flow downstream of the piston assembly.

14. The inlet pressure valve regulation system according to claim 11, further comprising:
    a lever configured to urge the valve component toward the floating valve seat; and
    a downstream regulation system having a regulator bellows in fluid communication with the fluid flow downstream of the piston assembly, the regulator bellows being configured to contact the lever and urge the valve component toward the floating valve seat in response to the fluid flow downstream of the piston assembly.

15. The inlet pressure valve regulation system according to claim 11, further comprising:
    a solenoid system being configured to urge the valve component toward the floating valve seat in response to a control system.

16. The inlet pressure valve regulation system according to claim 11, further comprising:
    a downstream regulation system having a regulator bellows in fluid communication with the fluid flow downstream of the piston assembly, the regulator bellows being configured to urge the valve component toward the floating valve seat in response to the fluid flow downstream of the piston assembly; and
    a solenoid system being configured to urge the valve component toward the floating valve seat in response to a control system.

17. The inlet pressure valve regulation system according to claim 11, wherein the piston assembly is configured to regulate the fluid flow by moving to close the inlet and further configured to regulate the fluid flow by moving to open the inlet.

18. The inlet pressure valve regulation system according to claim 11, wherein the floating valve seat includes a diaphragm and the floating valve seat having a passageway to fluidly connect the first valve chamber and the second valve chamber.

19. The inlet pressure valve regulation system according to claim 11, further comprising:
    a piston actuator to urge the piston assembly to close.

20. The inlet pressure valve regulation system according to claim 11, further comprising:
a downstream regulation system having a regulator bellows in fluid communication with the fluid flow downstream of the piston assembly, the regulator bellows being configured to expand and urge the valve component toward the floating valve seat in response to the fluid flow downstream of the piston assembly.

* * * * *